(12) United States Patent
Akae et al.

(10) Patent No.: US 8,295,267 B2
(45) Date of Patent: Oct. 23, 2012

(54) CLOCK SYNCHRONIZATION SYSTEM, METHOD, AND APPARATUS FOR COMMUNICATION

(75) Inventors: Yuuki Akae, Tokyo (JP); Atsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 12/840,897

(22) Filed: Jul. 21, 2010

(65) Prior Publication Data

US 2011/0019698 A1 Jan. 27, 2011

(30) Foreign Application Priority Data

Jul. 24, 2009 (JP) .................. 2009-173462

(51) Int. Cl.
*H04J 3/06* (2006.01)
*H04L 7/00* (2006.01)
*G06F 11/00* (2006.01)

(52) U.S. Cl. ......... 370/350; 370/509; 375/356; 713/503
(58) Field of Classification Search .................. None
See application file for complete search history.

(56) References Cited

U.S. PATENT DOCUMENTS

| | | | | |
|---|---|---|---|---|
| 7,706,823 | B2 * | 4/2010 | Buda et al. ................. | 455/502 |
| 2001/0043622 | A1 * | 11/2001 | Bernath et al. ............ | 370/516 |
| 2001/0046240 | A1 * | 11/2001 | Longoni et al. ............ | 370/503 |
| 2005/0116834 | A1 * | 6/2005 | Block et al. ............... | 340/825.21 |
| 2006/0056555 | A1 * | 3/2006 | Oono et al. ................. | 375/354 |
| 2006/0072695 | A1 * | 4/2006 | Iwamura .................... | 375/354 |

FOREIGN PATENT DOCUMENTS

| | | | |
|---|---|---|---|
| JP | 2003198519 | A | 7/2003 |
| JP | 2004186877 | A | 7/2004 |
| JP | 2007274612 | A | 10/2007 |
| JP | 2008177913 | A | 7/2008 |

* cited by examiner

*Primary Examiner* — Clemence Han (57) ABSTRACT

When the synchronization information, transmitted from a synchronization information output unit of a clock master side device, is detected by a synchronization information detection unit, the clock slave side device associates the synchronization information with the timestamp information at the time of detection of the synchronization information. Based on the timestamp information associated with the currently received synchronization information, the timestamp information associated with at least one synchronization information up to the synchronization information received last time and transmission period information of the synchronization information, a calculation/decision unit decides whether or not a predetermined condition is met. When the condition is met, the calculation/decision unit supplies the currently received synchronization information to a clock synchronization technique function unit. The clock synchronization technique function unit performs clock correction using the synchronization information. When the condition is not met, the calculation/decision unit discards the synchronization information currently received. The clock synchronization technique function unit performs clock correction based on the previously received synchronization information (FIG. 1).

20 Claims, 3 Drawing Sheets

CLOCK SYNCHRONIZATION SYSTEM, METHOD, AND APPARATUS FOR COMMUNICATION

REFERENCE TO RELATED APPLICATION

This application is based upon and claims the benefit of the priority of Japanese patent application No. 2009-173462, filed on Jul. 24, 2009, the disclosure of which is incorporated herein in its entirety by reference thereto.

TECHNICAL FIELD

This invention relates to a clock synchronization technology. More particularly, it relates to a system and method for clock synchronization in a communication network.

BACKGROUND

Clock synchronization on a network is affected by time delay ascribable to congestion on the network or by fluctuations in the processing time at a device interfacing unit. In case a wireless communication link is established between a clock master side device that generates a master clock and a clock slave side device that synchronizes the clock of the own device based on the master clock as a reference, fluctuations may be of a large magnitude. In such case, the state of transmission may be stable only on rare occasions. If, under such condition, the synchronization information received by the clock slave side device is directly processed with a clock synchronization correction operation, fluctuation components are superposed on the corrected value, such that correct clock synchronization may not be achieved.

In Patent Document 1 (JP Patent Kokai Publication No. JP-P2003-198519A), for example, which seeks to solve the problem that, in case a plurality of reference clocks are provided, and are referenced as they are interchanged, the reference clocks are not necessarily in phase with one another such that a generated clock references a new one of the reference clocks, on interchanging of the reference clocks, the generated clock follows the phase of the new reference clock, discloses a method for clock generation that uses a frequency measurement unit for measuring the frequency of each of the reference clocks and a frequency adjustment unit that matches the frequency of an output clock to the frequency of the reference clock. The generated clock is synchronized with the reference clock based on the frequency of the reference clock, as a reference, thereby eliminating phase transition of the generated clock as well as eliminating data slip. The generated clock is free from phase transition even in case the reference clocks are interchanged a plurality of numbers of times.

Patent Document 2 (JP Patent Kokai Publication No. JP-P2007-274612A) discloses a PLL device in which the signal level of a reference frequency signal supplied externally is monitored, and in which, when the signal level is within a predetermined range, PLL control is exercised using phase difference related data prepared by a phase difference data formulation means. In case the signal level is outside the predetermined range, it is determined that the signal supply has ceased or an unusual situation has occurred. In this case, the phase difference data is switched to the phase difference related data stored in a storage unit, for example, the latest stored data or data generated at the outset, in order to exercise PLL (phase synchronization loop) control.

Patent Document 3 (JP Patent Kokai Publication No. JP-P2004-186877A) discloses a wireless access network system, a wireless communication system, a synchronization server and a node device. The radio access network system includes a clock generator that periodically generates a clock, and a synchronization message generator that generates a synchronization message for notification of the information regarding the clock generated. The radio access network system also includes an IP packet transmission/processing unit that transmits a synchronization message to each node as IP packet. The radio access network system also includes an IP packet reception processor that receives the synchronization message at each node, and a transmission/reception time point calculation unit that acquires the time of reception of the synchronization message. The radio access network system further includes a clock correction processor that calculates a clock correction value based on the time of receipt acquired by the transmission/reception time calculation unit and on the clock related information notified by the synchronization message to correct the clock at each node based on this clock correction value.

Patent Document 4 (JP Patent Kokai Publication No. JP-P2008-177913A) discloses a communication apparatus and a clock reproducing method. In a slave side unit, a transmission/reception time interval comparator sets, in a received packet, the time information for the slave side unit and the sequence information contained in the received packet. Based on the time information and the sequence information of reception, as well as the time information of transmission and the sequence information, contained in the packet, at least one out of the interchange in the packet arrival sequence of received packets and packet dropout is checked. The interval of the time information of transmission and that of the time information of reception are calculated under control conforming to the result of the check. The difference between the interval of the time information of transmission and that of the time information of reception is calculated as being the transmission/reception time information interval. A smoothing unit smoothes a plurality of packets over a time information interval corresponding to a value calculated under control conforming to the result of the check to correct the offset contained in packets before and following the packet checked.

[Patent Document 1]
   JP Patent Kokai Publication No. JP P2003-198519A
[Patent Document 2]
   JP Patent Kokai Publication No. JP P2007-274612A
[Patent Document 3]
   JP Patent Kokai Publication No. JP P2004-186877A
[Patent Document 4]
   JP Patent Kokai Publication No. JP P2008-177913A

SUMMARY

The entire disclosure of Patent Documents 1-4 are incorporated herein by reference thereto.

The following is the analysis of the related technology by the present invention.

In a technique for clock synchronization on an asynchronous network, such as a packet network, it is not taken to be desirable to transmit/receive the information for clock synchronization in an extremely short duration because this might cause congestion of the entire network. For this reason, the information on clock synchronization is updated at an interval of the order of seconds. In this case, the clock slave side device is unable to monitor the frequency of the master clock for all time.

On the other hand, if simply the clock slave side device monitors the signal level, that is, the level of the signal received from the clock master side device, it is not possible to detect the fluctuations in the delay time caused on the packet network passed through by the synchronization information or the fluctuations in the processing time caused in the clock master side device. As a result, the component of these fluctuations is left in the clock salve side unit at the time of generation of the synchronization clock. It is thus not possible for the clock slave side device to certify that synchronization clock is being obtained to high accuracy.

It is an object of the present invention to provide a system, an apparatus, and a method, according to which it is possible to conclude validity/non-validity of the synchronization information supplied from the clock master side device to the clock slave side device, and according to which the transmission period of the synchronization information may be in a broad range from an extremely short duration to an order of seconds.

According to the present invention, there is provided a clock synchronization system comprising:

a clock master side device that generates a master clock;

a clock slave side device connected to the clock master side device via a network; and a clock synchronization function unit connected to clock slave side device, wherein the clock slave side device includes:

a synchronization information detection unit that detects synchronization information for clock synchronization from communication information transmitted from the clock master side and received by the clock slave side device, and that associates the synchronization information with time information in the clock slave side device when the synchronization information is detected; and a calculation/decision unit that decides, based on detection time information of the synchronization information currently received, detection time information of at least one synchronization information up to the synchronization information received last time, and a predetermined transmission period information of the synchronization information, whether or not a predetermined condition regarding the transmission period of the synchronization information is met, the calculation/decision unit supplying the currently detected synchronization information to the clock synchronization function unit in case it is decided that the condition is met, the calculation/decision unit discarding the currently detected synchronization information in case it is decided that the condition is not met, the clock synchronization function unit performing clock synchronization using the synchronization information supplied from the calculation/decision unit.

According to the present invention, there is provided a method for clock synchronization, comprising:

a clock slave side device receiving communication information transmitted from a clock master side device which generates a master clock and to which the clock slave side device is connected via a network;

the clock slave side device detecting synchronization information for clock synchronization from the communication information received and associating the synchronization information with time information in the clock slave side device when the synchronization information is detected;

the clock slave side device, based on detection time information of the synchronization information currently received, detection time information of at least one synchronization information up to the synchronization information received last time, and a predetermined transmission period information of the synchronization information, deciding whether or not a predetermined condition regarding the transmission period of the synchronization information is met; and the clock slave side device making a clock synchronization using the currently detected synchronization information in case it is decided that the condition is met, while the clock slave side device discarding the currently detected synchronization information in case it is decided that the condition is not met.

According to the present invention there is also provided a program causing a computer constituting a clock slave side device, to execute the processing comprising:

detecting the synchronization information for clock synchronization from the communication information transmitted thereto from said clock master side unit that generates a master clock, and correlating said synchronization information with the time information at said clock slave side unit at the time of detection of said synchronization information;

determining, based on the detection time information of the synchronization information, currently received, the detection time information of at least one synchronization information up to the synchronization information received last time, and on the predetermined transmit period information of the synchronization information, whether or not a predetermined condition regarding the transmit period of the synchronization information is met;

supplying the currently detected synchronization information to a clock synchronization functional section that prosecutes clock synchronization using the synchronization information, in case it is determined that said condition is met; and discarding the currently detected synchronization information in case it is determined that said condition is not met.

According to the present invention, there is provided a communication apparatus comprising:

a synchronization information detection unit that detects synchronization information for clock synchronization from received communication information transmitted via a network to the communication apparatus from a clock master device that generates a master clock, the synchronization information detection unit associating the synchronization information with time information in the communication apparatus when the synchronization information is detected;

a calculation/decision unit that determines, based on detection time information of the synchronization information, currently received, detection time information of at least one synchronization information up to the synchronization information received last time, and on a predetermined transmission period information of the synchronization information, whether or not a predetermined condition regarding the transmission period of the synchronization information is met, the calculation/decision unit supplying the currently detected synchronization information to a clock synchronization function unit in case it is decided that the condition is met, while the calculation/decision unit discarding the currently detected synchronization information in case it is decided that the condition is not met; and the clock synchronization function unit performing clock synchronization using the synchronization information supplied from the calculation/decision unit.

According to the present invention, it is possible to conclude the validity/non-validity of the synchronization information transmitted from the clock master side device to the clock slave side device. The synchronization information transmission period may be in a broad range from e.g., an extremely short duration to an order of seconds.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different exemplary embodiments, and its several details are capable of modifications in various obvious respects, all without departing from the invention. Accordingly, the drawing and description are to be regarded as illustrative in nature, and not as restrictive.

PREFERRED MODES

The principles of operation of the present invention will be described. According to the present invention, the validity/non-validity of the synchronization information is determined using the periodicity in transmitting the synchronization information from a clock master side device to a clock slave side device. According to the present invention, the transmission period of the synchronization information may be in a broad range such as from an extremely short duration to an order of seconds. According to the present invention, the transmission period is monitored so that, even if the delay time is abruptly changed due to a status change a network, and subsequently the delay time is stabilized, such fluctuations may readily be followed up without initializing the relationship for deciding the validity/non-validity of the synchronization information. This operation and effect may not be achieved with a system in which simply the magnitude relation of the delay time is monitored.

According to the present invention, fluctuations in the delay time on a packet network through which a packet is passed, or those in the processing time in the clock master side device, are monitored. Hence, the synchronization clock may be obtained, based on only the correct synchronization information free of fluctuation components, as the synchronization information with the fluctuation components is discarded. In addition, the scheme itself may be simplified and may readily be implemented.

The present invention may be applied with advantage to clock synchronization on an asynchronous network, such as a packet network. According to the present invention, the correct synchronization information may be obtained even under a deteriorated network status.

In one of preferred modes of the present invention, a synchronization information detection unit (10) of the clock slave side device detects the synchronization information for the clock from communication information transmitted from a synchronization information output unit (200) of the clock master side device. The synchronization information detection unit (10) associates the synchronization information with the time information (timestamp information) of its own device at the time point when the synchronization information is detected, and transfers the synchronization information and the associated detection time information to a calculation/decision unit (20).

Using the detection time information of the synchronization information, received from the synchronization information detection unit (10), the detection time information of the previously detected synchronization information, and the information on the transmission period of the synchronization information, the calculation/decision unit (20) calculates the fluctuations in the delay time/processing time produced on the network. When the calculation/decision unit (20) has determined, based on the result of calculations of the fluctuations, that the network is stabilized, the calculation/decision unit (20) transfers the synchronization information, currently detected, to a clock synchronization technique function unit (also termed as a clock synchronization function unit) (300) that performs adjustment of the clock synchronization (clock correction).

A clock synchronization technique function unit (300) performs clock correction based on the synchronization information supplied from the calculation/decision unit (20).

According to the present invention, the clock synchronization technique function unit (300) can extract selectively the clock synchronization information in the stabilized network condition. As a result, the clock synchronization technique function unit (300) is able to correct the clock in the clock slave side device (100), by way of timing adjustment, based on the reliable synchronization information, without being affected by delay time fluctuations on the network or by an occurrence of traffic congestion. The clock slave side device (100) may establish clock synchronization with the clock master side device over the network.

The present invention exploits the fact that the transmission intervals of the synchronization information from the clock master side device to the clock salve side unit in a majority of clock synchronization systems in a number of networks are periodic. In case of extracting the synchronization information, offset from the periodicity of transmission of the synchronization information, the clock slave side device (100) discards such synchronization information. Thus, the transfer to a holdover function of the clock slave side device (100) is conducted.

In case the synchronization information is discarded by the calculation/decision unit (20) in the clock slave side device (100), the clock synchronization technique function unit (300) continues with the clock correction with the use of the synchronization information received last time from the calculation/decision unit (20).

By this arrangement, it is possible for the clock slave side device (100) to discard the synchronization information having a large fluctuation component, such as a network delay. The synchronization information under the stabilized network may selectively be extracted to allow for the calculation of the correction value for clock synchronization, as a result of which an accurate clock synchronization correction value may be obtained in stability. The present invention will now be described with reference to certain preferred exemplary embodiments.

<Exemplary Embodiment 1>

Figure 1:
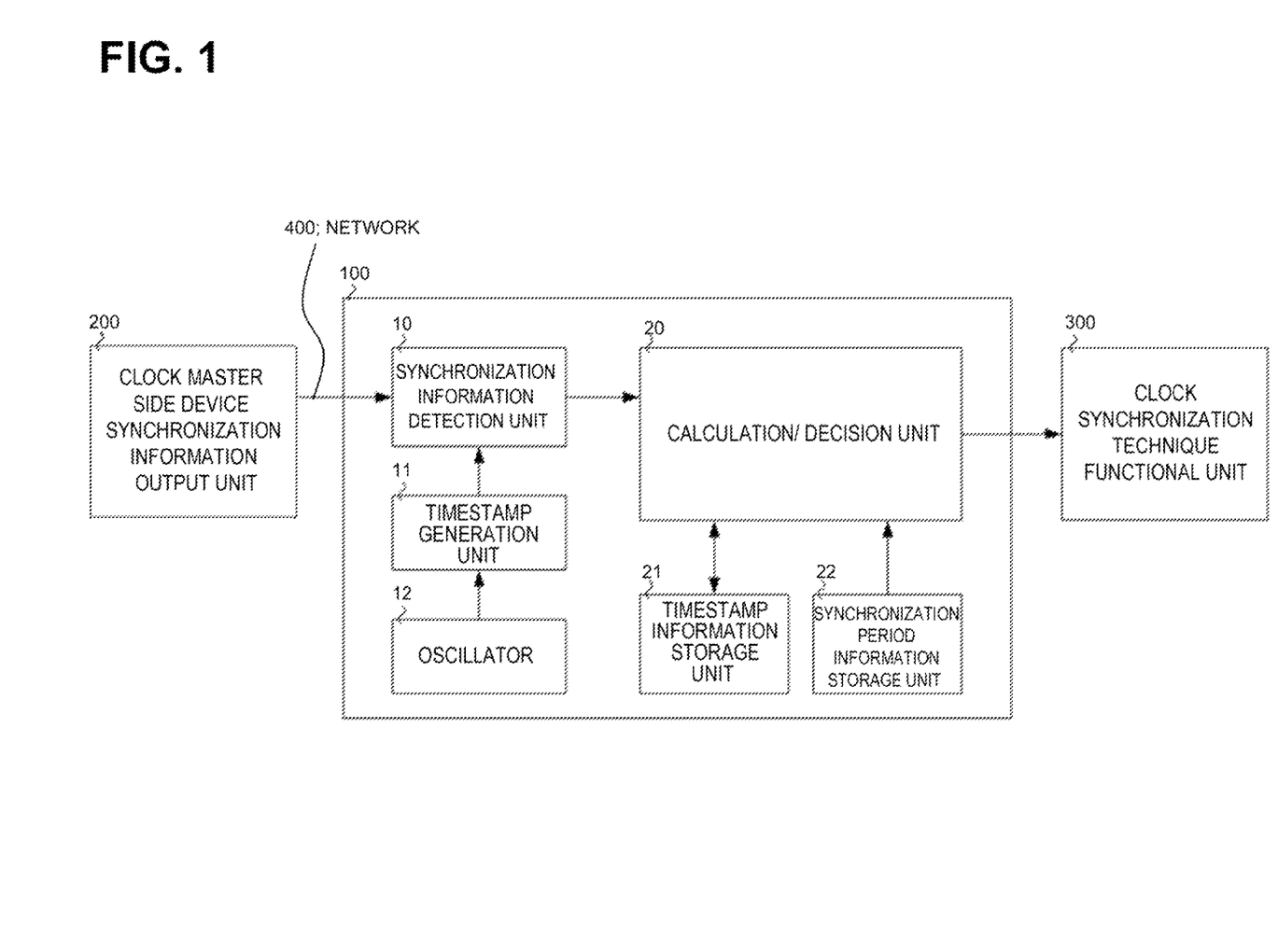
FIG. 1 is a diagram showing an arrangement of an exemplary embodiment of the present invention.

FIG. 1 is a block diagram showing a configuration of a first exemplary embodiment of the present invention. Referring to FIG. 1, in the present exemplary embodiment, there are provided a synchronization information output unit 200 of a clock master side device, a clock slave side device 100 and a clock synchronization technique function unit 300. The clock slave side device 100 includes a synchronization information detection unit 10, a timestamp generation unit 11, an oscillator 12, a calculation/decision unit 20, a timestamp information storage unit 21 and a synchronization period information storage unit 22.

The synchronization information detection unit 10 is arranged on the side the clock slave side device 100 in a packet network 400 interconnecting the clock slave side device 100 and the clock master side device.

The synchronization information detection unit 10 monitors the communication information which is transmitted from the synchronization information output unit 200 of the clock master side device via the network 400 to the clock slave side device 100. The synchronization information detection unit 10 detects the synchronization information used for clock synchronization from the received communication information.

On detection of the synchronization information, the synchronization information detection unit 10 reads the detection time information of the synchronization information from the timestamp generation unit 11. The synchronization information detection unit 10 associates the synchronization information with the information regarding the time of detection of the synchronization information to transmit the synchronization information associated with the detection time information to the calculation/decision unit 20.

The timestamp generation unit 11 generates the timestamp information, indicating a current time, based on a clock signal from the oscillator 12.

The oscillator 12 transmits a clock signal, having a particular constant frequency, to the timestamp generation unit 11.

The calculation/decision unit 20 reads the detection time information of the last but one synchronization information received, and the transmission period information of the synchronization information, output from the synchronization information output unit 200 of the clock master side device, respectively, from the timestamp information storage unit 21 and the synchronization period information storage unit 22, using the reception of the synchronization information from the synchronization information detection unit 10 and the detection time information associated with the synchronization information as a trigger.

Based on the information regarding the time of detection of the synchronization information, currently detected, and the information regarding the time of detection of the synchronization information, detected last time, the calculation/decision unit 20 checks to see whether or not the current synchronization information is valid in consideration of the condition for the synchronization information transmission period. This condition will be described later with reference to a relationship (1) which will be given below.

In case the calculation/decision unit 20 has determined the current synchronization information to be valid, the calculation/decision unit 20 transmits the synchronization information from the synchronization information detection unit 10 to the clock synchronization technique function unit 300 provided on the clock slave side device 100.

In case the calculation/decision unit 20 has determined the synchronization information to be non-valid, the calculation/decision unit discards the synchronization information from the synchronization information detection unit 10.

After decision of the validity of the synchronization information by the calculation/decision unit 20, the detection time information, associated with the synchronization information, is stored in the timestamp information storage unit 21, irrespectively of the results of valid/non-valid decision of the synchronization information.

The timestamp information storage unit 21 includes a register, not shown. In response to a data read request from the calculation/decision unit 20, the timestamp information storage unit 21 transmits the detection time information of the last but one synchronization information, stored in the register, to the calculation/decision unit 20. In response to a data write request from the calculation/decision unit 20, the timestamp information storage unit 21 stores the detection time information of the synchronization information of the current time point in the register.

The synchronization period information storage unit 22 includes a register, not shown. A predetermined constant transmission period of the synchronization information, transmitted from the synchronization information output unit 200 of the clock master side device to the clock slave side device 100, is stored in the synchronization period information storage unit 22. In response to the data read request from the calculation/decision unit 20, the synchronization period information storage unit 22 outputs the stored transmission period of the synchronization information to the calculation/decision unit 20.

The synchronization information output unit 200 of the clock master side device is mounted on the clock master side device. The synchronization information output unit 200 of the clock master side device extracts the synchronization information, used for clock synchronization in the clock synchronization technique function unit 300, from its own internal clock, and outputs so extracted synchronization information to the clock slave side device.

The clock synchronization technique function unit 300 is connected either inside or outside the clock slave side device 100. The clock synchronization technique function unit 300 operates, based on the synchronization information from the clock master side device, to correct the clock of the clock slave side device, and to synchronize the clock of the clock slave side device 100 with the clock of the clock master side device. The clock synchronization technique function unit 300 keeps on holding thereon a corrected value of the clock, calculated based on the latest synchronization information, until the new synchronization information is entered.

The clock synchronization technique function unit 300 is equipped with the hold-over function that performs correction of the clock, based on the correction value of the clock it holds even when the synchronization information thereto is interrupted.

Figure 2:
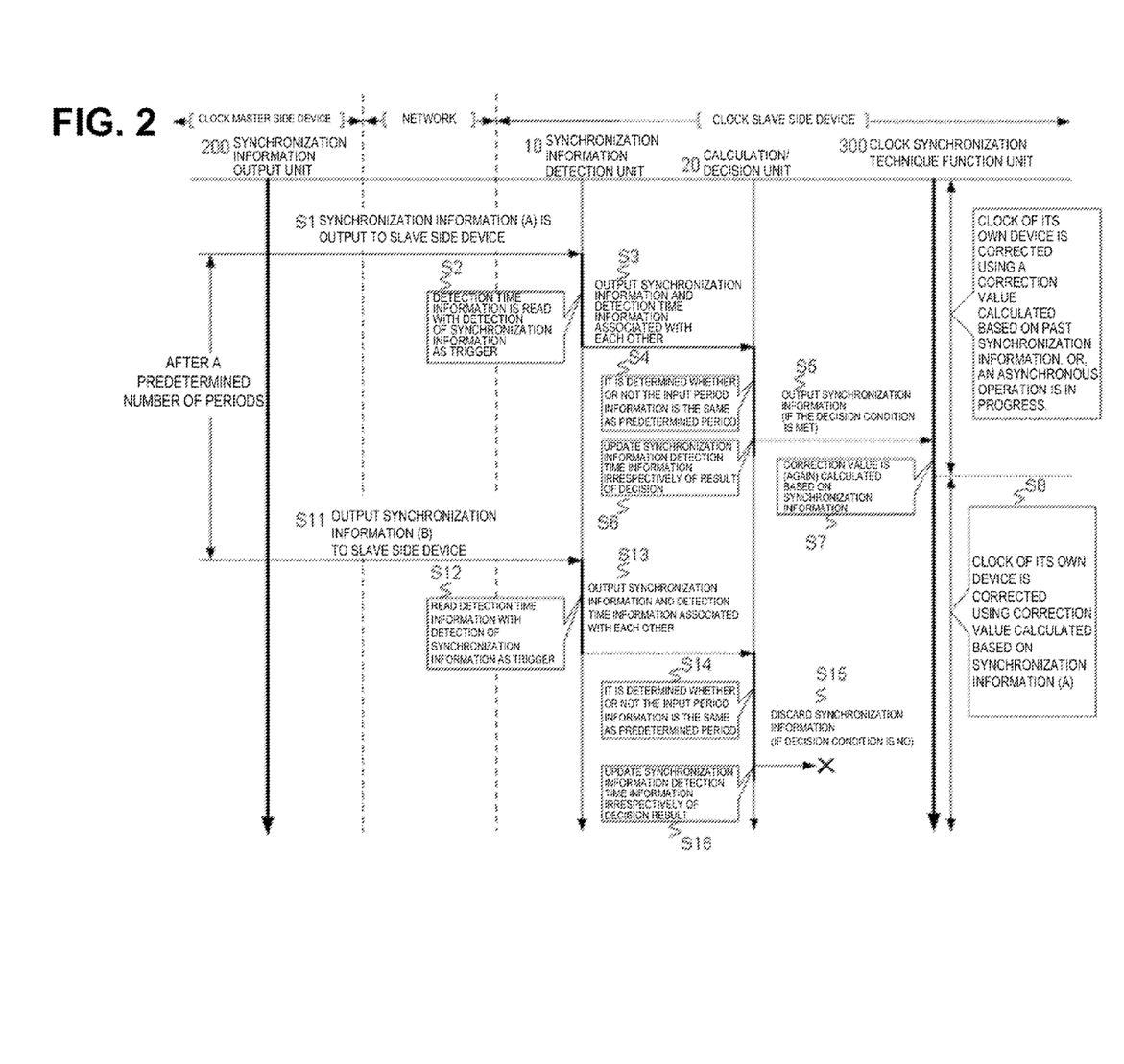
FIG. 2 is a schematic view showing the operation of the exemplary embodiment of the present invention.

FIG. 2 is a timing chart for illustrating the operation of the present exemplary embodiment. Referring to FIGS. 1 and 2, the operation of the present exemplary embodiment will now be described.

In FIG. 2, the synchronization information (A), including master clock information, is transmitted from the synchronization information output unit 200 of the clock master side device over a packet network to the synchronization information detection unit 10 of the clock slave side device 100 (S1).

Using the detection of the synchronization information (A) as a trigger, the synchronization information detection unit 10 reads the time information regarding the detection of the synchronization information (S2).

The synchronization information detection unit 10 associates the so read detection time information with the synchronization information (A) and supplies the resulting information to the calculation/decision unit 20 (S3).

The calculation/decision unit 20 reads the detection time information of the last but one synchronization information it has received, and the update period information of the synchronization information, using the inputting of the information from the synchronization information detection unit 10 as a trigger. The calculation/decision unit 20 decides on the validity/non-validity of the synchronization information based on the respective information species received (S4).

In the present exemplary embodiment, a decision is made, on calculation, in order to check to see whether or not the following relationship (1) is satisfied:

$$\begin{aligned}\text{(update period of the synchronization information)}=\\ \text{(detection time of the synchronization information}\\ (A))-\text{(detection time of the last but one synchronization information received)}\end{aligned} \quad (1)$$

If the above relationship (1) is satisfied, it indicates that the synchronization information has arrived at the clock slave side device with a period equal to a predetermined period. It may thus be inferred that the synchronization information is in a stable state free of fluctuations in the delay time caused on the packet network passed through by the packet or of fluctuations in the processing time caused on the clock master side device.

If, as the result of the calculations of the relationship (1), the synchronization information (A) is determined to be reliable, the calculation/decision unit 20 supplies the synchronization information (A) to the clock synchronization technique function unit 300 (S5).

The calculation/decision unit 20 also newly stores the time of detection of the synchronization information (A) in the timestamp information storage unit 21 (S6). The time of detection thus stored is to be used as the time of detection of the last but one synchronization information received when next the synchronization information has been entered.

The clock synchronization technique function unit 300, supplied with the synchronization information (A), calculates an offset between the clock of the clock slave side device and the clock of the clock master side device, based on the synchronization information (A) (S7).

Using the so calculated clock correction value, the clock synchronization technique function unit 300 corrects the clock of the own device (S8) to synchronize the clock of the clock master side device with that of the clock slave side device.

Next, the case of the synchronization information (B) is considered in the context of the present exemplary embodiment. With the synchronization information (B), it is assumed that, due to fluctuations in the delay time caused on the packet network, the information has passed through, or to fluctuations in the processing time caused on the clock master side device, the period of the input to the clock slave side device is not true to the predetermined period.

The synchronization information (B), including the master clock information, is supplied from the synchronization information output unit 200 of the clock master side device via the packet network to the synchronization information detection unit 10 of the clock slave side device 100 (S11).

The synchronization information detection unit 10 reads the detection time information of the synchronization information (B), using the detection of the synchronization information as a trigger (S12).

The synchronization information detection unit 10 associates the read-out detection time information with the synchronization information (B) and supplies the resulting information to the calculation/decision unit 20 (S13).

The calculation/decision unit 20 checks to see whether or not the following relationship (2) is satisfied (S14):

$$\begin{aligned}\text{(update period of the synchronization information)}=\\ \text{(time of detection of the synchronization information}\\ (B))-\text{(time of detection of the synchronization information }(A))\end{aligned} \quad (2)$$

The relationship (2) fails to hold because of the above assumption. Hence, the calculation/decision unit 20 determines the synchronization information (B) to be unreliable and discards it (S15). The synchronization information (B) is not transmitted by the calculation/decision unit 20 to the clock synchronization technique function unit 300.

The calculation/decision unit 20 newly stores only the time of detection of the synchronization information (B) in the timestamp information storage unit 21 (S16). The detection time, thus stored in the timestamp information storage unit 21, is then used, when the synchronization information has been supplied from the synchronization information output unit 200 of the clock master side device, as the time of detection of the last but one synchronization information received.

No new synchronization information is thus supplied to the clock synchronization technique function unit 300. Hence, the clock synchronization technique function unit 300 performs the hold-over function in which the clock synchronization technique function unit 300 continues to correct the clock of its own device using the clock correction value calculated based on the past synchronization information (A).

With the above described operation of the clock slave side device 100, it is possible to prevent that clock correction will be made based on the erroneous synchronization information. In addition, it is possible to extract only the reliable synchronization information under the stable state of an input/output unit on a packet network passed through by the information from the master side unit, or on the packet network, in order to perform the clock synchronization. It is observed that the erroneous synchronization information would be generated due to fluctuations in the time delay caused on the packet network or to fluctuations in the processing time caused in the input/output unit.

EXAMPLE

As an example of the present invention, a specific example, in which, in the synchronization information detection unit 10 of FIG. 1, the synchronization information is detected from the communication information, will now be described. This specific example is for such a case in which the clock slave side device and the clock master side device are each used as a relaying device for a layer-2 switch on the packet network. It should be noted that such case is merely illustrative and is not to be interpreted to be restrictive. An Ethernet (registered trade mark) frame, defined by the IEEE (the Institute of Electrical and Electronics Engineer, Inc.) 802.3, is transmitted/received between the two devices. A transmission destination (MAC) address field (6 octets), a transmission source (MAC) address field (6 octets) and a type field (2 octets) are included in a header of the Ethernet frame. The type field, called ('EtherType'), indicates what sorts, that is, protocols, of data make up the data part (frame type). On receipt of an Ethernet frame, the clock master side device and the clock slave side device read the addresses to decide on the destination of relaying of the Ethernet frame. The clock master side device and the clock slave side device arrange on the EtherType of a packet including the synchronization information, so that, when the clock slave side device receives the Ethernet frame, it reads the EtherType of the header to determine whether the packet in question is a packet including the synchronization information or a packet different from it. The clock slave side device accordingly detects the synchronization information from the communication information. In the following, 'Precision Time Protocol' (PTP), defined in IEEE1588, is taken as illustrative of the synchronization information.

The 'Precision Time Protocol' is one of specifications of the synchronization technique on the network. When it is used in Ethernet, a numerical value '0x88f7' is specified for the EtherType of the Ethernet header. An Ethernet frame, having this EtherType, includes the information on date and time (timestamp) at a unit that transmitted the frame and at a time point the frame was transmitted. The information indicating the date and time (timestamp) is calculated from the time uniquely counted by each unit. Hence, the timestamp on the clock master side device and that on the clock slave side device at a given general time point A are usually not coincident with each other and suffer from an offset. This offset is corrected by setting the timestamp on the clock slave side device into registration with that on the clock master side device so that the two units will operate on the same time axis by way of clock synchronization. In other protocols than the Ethernet protocol, there is prescribed a code that allows the relay unit side to conclude whether the data in question is the general user data or control data. It is possible to detect only the synchronization information from the communication information based on an identifier of the particular code.

In the present example, the above relationship (1) is used as a means for determining whether or not the synchronization information is valid. The information possessed by the synchronization information itself, namely, the information indicating the date and time at a time point the clock master side device transmitted the frame in question, is not used. In the present example, what specified contents are included in the synchronization information is substantially not relevant to decision on the validity of the synchronization information.

In the present exemplary embodiment, the following operation and meritorious effects are derived.

According to the present invention, the information on fluctuations in the transfer delay time through the packet network or in the processing time of a device is calculated to determine the validity/non-validity of the synchronization information. It is thus possible to prevent that undesirable synchronization information is entered into procedures of a variety of clock synchronization techniques.

In case there is a wireless link on a packet network, the fluctuations in the transfer delay time tend to be increased. This may account for the high practical merit of the present invention having a functional means for extracting selectively the valid synchronization information.

According to the present invention, the clock synchronization technique itself is not meddled with. Any clock synchronization technique may be comprised within the scope of the present invention provided that the clock synchronization technique uses a holdover operation of keeping on correcting the clock of an own device in case no new synchronization information is provided. In this holdover operation, a clock correction value calculated based on the past synchronization information is to be used.

<Exemplary Embodiment 2>

A second exemplary embodiment of the present invention will now be described. The basic configuration of the second exemplary embodiment is the same as that of the first exemplary embodiment. However, the second exemplary embodiment is simplified in comparison with the first exemplary embodiment.

In the first exemplary embodiment, the decision expression (1), used by the calculation/decision unit 20 of FIG. 1, is given by (update period of the synchronization information)=
(time of detection of the synchronization information)−(time of detection of the last but one synchronization information received).

However, it is not mandatory that the left and right sides of the relationship coincide with each other, such that it is assumed to be only rare that the two sides of the relationship coincide with each other.

Thus, an allowance may be provided in dependence upon an error allowed in an environment in which the present invention is used. In this case, the following decision expression (3) is provided to determine whether or not an absolute value is within an allowable range.

$$|\text{(time of detection of synchronization information−time of detection of the last but one synchronization information received)−(update period of the synchronization information)}| <= \text{allowance} \quad (3)$$

In the above described first exemplary embodiment, the timestamp information storage unit 21 of FIG. 1 holds only the detection time information of the last but one synchronization information. However, it is not mandatory that the information held is the last but one time detection information.

That is, it is possible for the timestamp information storage unit 21 to hold the detection time information for each of several events of past detection of the synchronization information. In this case, at least one of such past information may be used in the calculation/decision unit 20. In such a case, as an exemplary embodiment of the present invention, the condition for decision may be in the form of consecutive coincidence of the following three conditions:

$$|\text{(time of detection of the synchronization information−time of detection of the last but one synchronized information received)−update period of synchronization information}| <= \text{allowance} \quad (4)$$

$$|\text{(time of detection of the last but one synchronization information received−time of detection of the last but two synchronization information received)−update period of synchronization information}| <= \text{allowance} \quad (5)$$

$$|\text{(time of detection of the last but two synchronization information received−time of detection of the last but three synchronized information received)−update period of synchronization information}| <= \text{allowance} \quad (6)$$

The synchronization information is determined to be valid only when the relationships (4) to (6) are satisfied simultaneously.

By using the form of the consecutive coincidence of the three conditions, the synchronization information may be extracted more reliably under a stabilized environment.

In a system in need of clock synchronization of high accuracy, the degree of accuracy of an oscillator for timestamp generation, locally possessed by each of the clock master Side device and the clock slave side device, viz., the oscillator 12 of FIG. 1, becomes non-negligible.

If the accuracy of the oscillator of the clock master side device and that of the clock slave side device are each ±100 ppm (parts by million), the time difference between the timestamp of the clock master side device and that of the clock slave side device are each 200 micro second per a second at the maximum. As a scheme for taking up the difference between the accuracy degree of the clock master side oscillator and that of the slave master side oscillator, an algorithm that corrects, as appropriate, the allowance discussed in connection with the above mentioned second exemplary embodiment, may be incorporated into the system.

<Exemplary Embodiment 3>

As a third exemplary embodiment of the present invention, such a mechanism that statistically holds the difference between the ideal synchronization information transmission period stored in the synchronization period information storage unit 22 and the actual synchronization information detection period is provided in the calculation/decision unit 20. For example, by truncating a value near the maximum and a value near the minimum and finding a mean value, it becomes possible to obtain a center value of the fluctuations of the delay time on the packet network passed through by the synchronization information or the fluctuations of the processing time in the clock master side device. The center value of these fluctuations is taken to represent the time count errors generated due to the accuracy difference between the oscillators of the clock master side device and the clock slave side device. The center value of the fluctuations may be set as representing a midpoint value of the range of allowance.

By shifting the center position without changing the magnitude of the range of the allowance, it becomes possible to correct the accuracy difference of the oscillators of the clock master side device and the clock slave side device without varying the accuracy of the relationship used for determining the validity/non-validity of the synchronization information.

<Exemplary Embodiment 4>

In the above described first exemplary embodiment, a particular constant transmission period of the synchronization information from the clock master side device to the clock slave side device is preset in the synchronization period information storage unit 22 of FIG. 1. However, there are occasions where the transmission period is varied depending on environments.

Figure 3:
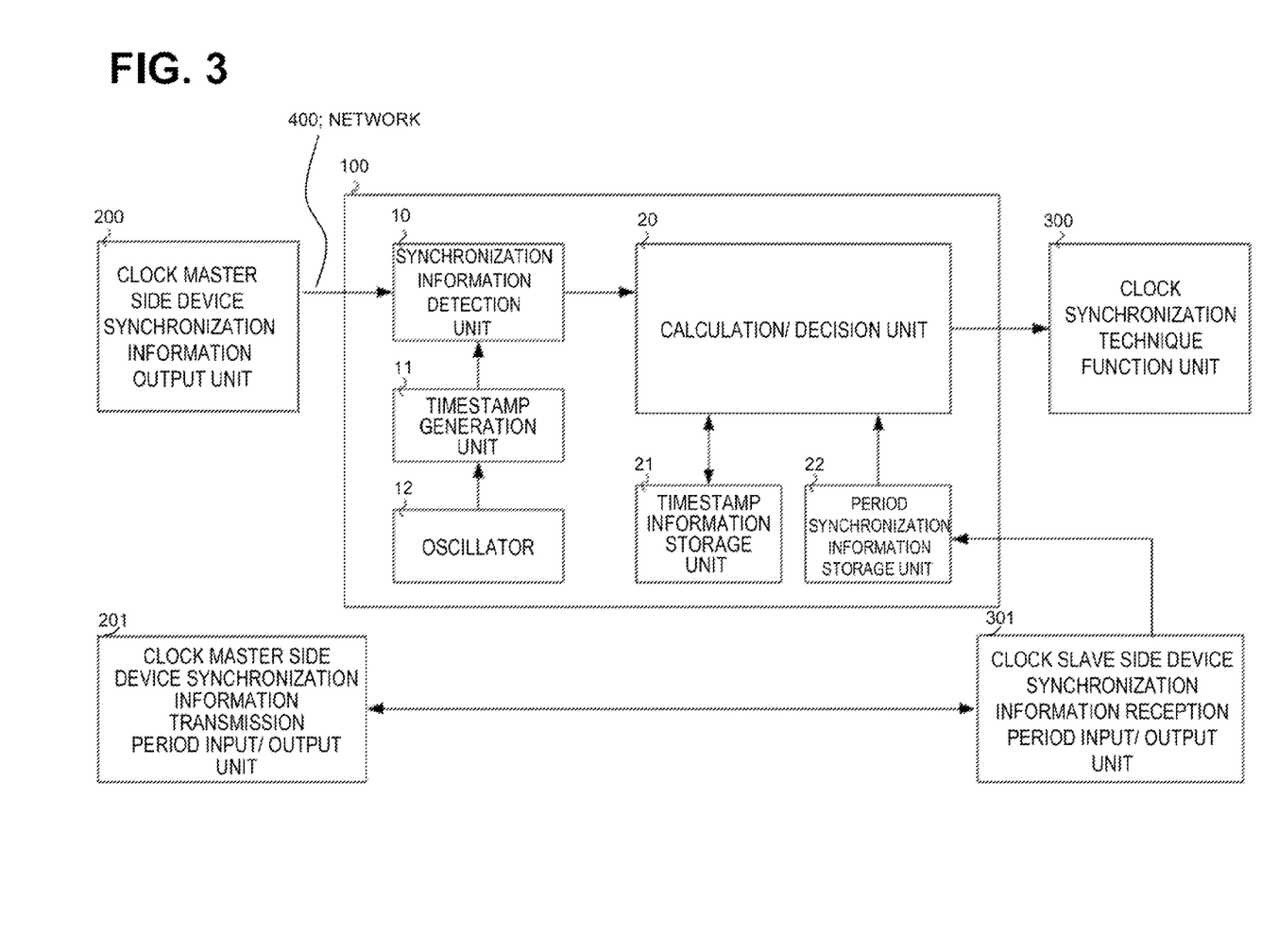
FIG. 3 is a block diagram showing an arrangement of another exemplary embodiment of the present invention.

Thus, in a fourth exemplary embodiment of the present invention, such a function of storing a new transmission period of the synchronization information in a synchronization period information storage unit 22 is added, as shown in FIG. 3.

It is only sufficient that a function of determining the transmission period of the synchronization information is possessed by at least one of the clock master side device and the clock slave side device.

When the clock master side device determines the transmission period of the synchronization information, the clock master side device changes the transmission period of its own device and notifies the clock slave side device of the new transmission period of the synchronization information.

When the clock slave side device is to determine the transmission period of the synchronization signal, the clock master side device needs to be notified of the transmission period of the synchronization information which has been determined by the clock slave side device as the new synchronization information transmission period. It is then up to the clock master side device to change the transmission period. The transmission period of the synchronization information determined by the clock slave side device, is a receiving period of the synchronization information of the clock slave side device, from a point of view from the clock master side device side.

If both the clock master side device and the clock slave side device possess the function of determining the transmission period, it is sufficient to decide on a sole value based on arrangement between the clock master side device and the clock slave side device.

In the case of FIG. 3, it is the clock master side device that determines the transmission period of the synchronization information. A synchronization information transmission period input/output unit 201 of the master clock side unit outputs the synchronization information transmission period. A synchronization information reception period input/output unit 301 of the clock slave side device inputs the synchronization information transmission period. The synchronization information transmission period, received by the synchronization information reception period input/output unit 301 of the clock slave side device, is stored in the synchronization period information storage unit 22. If it is the clock slave side device that determines the transmission period of the synchronization information, the transmission period is supplied from the synchronization information reception period input/output unit 301 of the clock slave side device to the synchronization information transmission period input/output unit 201 of the master clock side unit.

In the above mentioned Patent Documents 3 and 4, the transmit interval of the synchronization information packet from the clock master side device is measured using the transmission timestamp information included in the clock synchronization information packet. According to the present invention, it is unnecessary to measure the transmission interval, while it is also unnecessary to refer to e.g., the transmission timestamp information included in the clock synchronization information packet. Which are the contents of the synchronization information in a frame is substantially not relevant to the decision of the validity of the synchronization information in the present invention.

The disclosures of the above mentioned Patent Documents 1-4 are incorporated by reference herein. The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may comprehend various modifications or corrections that may occur to those skilled in the art in accordance with and within the gamut of the entire disclosure of the present invention, inclusive of the claims and the technical concept of the present invention.

What is claimed is:

1. A clock synchronization system comprising:
a clock master side device that generates a master clock;
a clock slave side device connected to the clock master side device via a network; and
a clock synchronization function unit connected to clock slave side device, wherein the clock slave side device includes:
a synchronization information detection unit that detects synchronization information for clock synchronization from communication information transmitted from the clock master side and received by the clock slave side device, and that associates the synchronization information with time information in the clock slave side device when the synchronization information is detected; and
a calculation/decision unit that decides, based on detection time information of the synchronization information currently received, detection time information of at least one synchronization information up to the synchronization information received last time, and a predetermined transmission period information of the synchronization information, whether or not a predetermined condition regarding the transmission period of the synchronization information is met,
the calculation/decision unit supplying the currently detected synchronization information to the clock synchronization function unit in case it is decided that the condition is met, the calculation/decision unit discarding the currently detected synchronization information in case it is decided that the condition is not met,
the clock synchronization function unit performing clock synchronization using the synchronization information supplied from the calculation/decision unit.

2. The clock synchronization system according to claim 1, wherein when the calculation/decision unit discards the synchronization information, the clock synchronization function unit continues with clock synchronization using the synchronization information supplied last time from the calculation/decision unit.

3. The clock synchronization system according to claim 1, wherein the clock slave side device comprises
   a timestamp generation unit that generates time information of the clock slave side device,
   wherein the synchronization information detection unit determines whether or not a preset value indicating the synchronization information is provided in a predetermined region of a header part of a frame making up the communication information to detect the synchronization information, and
   the synchronization information detection unit acquires the time information from the timestamp generation unit when the synchronization information is detected to supply the time information acquired to the calculation/decision unit.

4. The clock synchronization system according to claim 1, wherein the clock slave side device comprises
   a storage unit,
   wherein the calculation/decision unit stores detection time information of the current synchronization information in the storage unit for use in making a decision on the condition when a next synchronization information is detected, irrespectively of whether or not the current synchronization information has met the condition.

5. The clock synchronization system according to claim 1, wherein the predetermined condition includes any one out of:
   a condition that a first difference between the detection time of the current synchronization information and the detection time of the last synchronization information is equal to an update period of the synchronization information; and
   a condition that an absolute value of a second difference between the first difference and the update period of the synchronization information is within a predetermined allowance range.

6. The clock synchronization system according to claim 5, wherein the calculation/decision unit checks to see whether or not the predetermined condition is met not only as to the first difference between the detection time of the current synchronization information and the detection time of the last synchronization information but also as to a difference between the detection time of each of a plurality of items of past synchronization information and a preceding detection time of the past synchronized information.

7. The clock synchronization system according to claim 5, wherein the calculation/decision unit checks to see whether or not the predetermined condition is met using a result of statistical processing of differences of detection time of the synchronization information.

8. The clock synchronization system according to claim 1, wherein at least one of the clock master side device and the clock slave side device comprises
   a unit that determines the transmission period information of the synchronization information which is transmitted from the clock master side device to the clock slave side device and that notifies the determined transmission period information to the other.

9. A method for clock synchronization, comprising:
   a clock slave side device receiving communication information transmitted from a clock master side device which generates a master clock and to which the clock slave side device is connected via a network;
   the clock slave side device detecting synchronization information for clock synchronization from the communication information received and associating the synchronization information with time information in the clock slave side device when the synchronization information is detected;
   the clock slave side device, based on detection time information of the synchronization information currently received, detection time information of at least one synchronization information up to the synchronization information received last time, and a predetermined transmission period information of the synchronization information, deciding whether or not a predetermined condition regarding the transmission period of the synchronization information is met; and
   the clock slave side device making a clock synchronization using the currently detected synchronization information in case it is decided that the condition is met, while the clock slave side device discarding the currently detected synchronization information in case it is decided that the condition is not met.

10. The method for clock synchronization according to claim 9, comprising
    the clock slave side device continuing with making the clock synchronization using the synchronization information decided last time to meet the condition, in case the synchronization information is discarded.

11. The method for clock synchronization according to claim 9, comprising:
    the clock slave side device detecting the synchronization information by deciding whether or not a preset value indicating the synchronization information is provided in a predetermined area of a header of a frame making up the communication information; and
    the clock slave side device acquiring the time information generated by a timestamp generation unit in the clock slave side when the synchronization information is detected, and associating the time information, thus acquired, with the synchronization information.

12. The method for clock synchronization according to claim 9, comprising
    the clock slave side device storing detection time information of the current synchronization information in a storage unit in the clock slave side device for use in making a decision on the condition when a next synchronization information is detected, irrespectively of whether or not the current synchronization information has met the condition.

13. The method for clock synchronization according to claim 9, wherein the predetermined condition includes any one out of:
    a condition that a first difference between the detection time of the current synchronization information and the detection time of the last synchronization information is equal to an update period of the synchronization information; and
    a condition that an absolute value of a second difference between the first difference and the update period of the synchronization information is within a predetermined allowance range.

14. The method for clock synchronization according to claim 13, comprising
    the clock slave side device checking whether or not the predetermined condition is met not only with respect to the first difference between the detection time of the current synchronization information and the detection time of the last synchronization information but also with respect to the difference between the detection time of each of a plurality of past synchronization information and a preceding detection time of the past synchronization information.

15. The method for clock synchronization according to claim 13, comprising
the clock slave side device checking whether or not the predetermined condition is met using the result of statistical processing of differences of detection time of the synchronization information.

16. The method for clock synchronization according to claim 9, comprising
at least one of the clock master side device and the clock slave side device determining the transmission period information of the synchronization information which is transmitted from the clock master side device to the clock slave side device, and notifying the determined transmission period information to the other.

17. A communication apparatus comprising:
a synchronization information detection unit that detects synchronization information for clock synchronization from received communication information transmitted via a network to the communication apparatus from a clock master device that generates a master clock, the synchronization information detection unit associating the synchronization information with time information in the communication apparatus when the synchronization information is detected;
a calculation/decision unit that determines, based on detection time information of the synchronization information, currently received, detection time information of at least one synchronization information up to the synchronization information received last time, and on a predetermined transmission period information of the synchronization information, whether or not a predetermined condition regarding the transmission period of the synchronization information is met,
the calculation/decision unit supplying the currently detected synchronization information to a clock synchronization function unit in case it is decided that the condition is met, while the calculation/decision unit discarding the currently detected synchronization information in case it is decided that the condition is not met; and
the clock synchronization function unit performing clock synchronization using the synchronization information supplied from the calculation/decision unit.

18. The communication apparatus according to claim 17, wherein when the calculation/decision unit discards the synchronization information, the clock synchronization function unit continues with clock synchronization with the use of the synchronization information received last time from the calculation/decision unit.

19. The communication apparatus according to claim 17, further comprising
a timestamp generation unit that generates time information, wherein the synchronization information detection unit determines whether or not a preset value indicating the synchronization information is provided in a predetermined region of a header part of a frame making up the communication information to detect the synchronization information, and
the synchronization information detection unit acquires the time information from the timestamp generation unit when the synchronization information is detected to supply the time information acquired to the calculation/decision unit.

20. The communication apparatus according to claim 17, further comprising
a storage unit,
wherein the calculation/decision unit stores detection time information of the current synchronization information in the storage unit for use in making a decision on the condition at the time of detection of the next synchronization information, irrespectively of whether or not the current synchronization information has met the condition.

* * * * *